UNITED STATES PATENT OFFICE.

HENRY B. SLATER, OF DETROIT, MICHIGAN.

PROCESS OF EXTRACTING ZINC FROM ORES CONTAINING PRECIOUS METALS.

SPECIFICATION forming part of Letters Patent No. 399,706, dated March 19, 1889.

Application filed March 29, 1888. Serial No. 268,893. (No specimens.)

*To all whom it may concern:*

Be it known that I, HENRY B. SLATER, a citizen of the United States, residing at Detroit, county of Wayne, State of Michigan, have invented a certain new and useful Improvement in the Process of Extracting Zinc from Ores Containing Precious Metals; and I declare the following to be a full, clear, and exact description of the same, such as will enable others skilled in the art to which it appertains to make and use the same.

My invention consists in a process of separating zinc from ores containing precious metals, hereinafter fully described and claimed.

There are large bodies of ore containing zinc and precious metals in which the zinc exists in such combination that it is not profitable to treat them for zinc by the ordinary methods, and in which the quantity of zinc present renders the cost of smelting so high that it is not profitable to smelt such ores for the other metals which they contain, and they are therefore practically worthless.

I will describe my process as practiced upon sulphides of the precious metals containing zinc; but I do not wish to be understood that it is limited solely to said ores, as carbonate ores carrying zinc and silver may be treated by this process.

The ore is first crushed as for ordinary roasting. If the ore contains little or no sulphur, a valuable result may be obtained by my process without roasting; but I prefer to roast in all cases for the purpose of preparing the zinc for the subsequent chlorinating operation. The ore may be partially roasted, whereby the zinc, lead, and silver are converted into sulphates, or partly into sulphates and partly into oxides, the roasting being continued at a low temperature until all of the zinc is converted into sulphate and oxide. When this point is reached, from thirty to fifty per cent. of the zinc will be in the form of an oxide, and the balance will be in the form of a sulphate. If the roasting is continued beyond this, it will result in a loss of any precious metals—as silver—which the ore may contain by volatilization. I then put the ore, the same having been moistened with sufficient water to convert it to what is known as the "woolly condition," into a covered tank or box called a "chlorinating-vat," made of wood or other material not readily acted upon by chlorine, and subject the ore to the action of free chlorine, say until all the silver is converted into chloride of silver and all the lead into chloride of lead.

I prefer to stop the chlorination process as soon as all the oxide of zinc is converted into chloride of zinc, especially in ores containing iron. The point at which to stop the chlorination process is ascertained by noting the quantity of chlorine passed into the ore, the chemical composition of the ore having been already determined, and also by taking a sample of the ore from the chlorinator at or near the point of entry of the chlorine from time to time during the process and testing the same for iron or zinc. The chlorine attacks other metals as well as zinc, and converts some into soluble and others into insoluble chlorides. Now, since chloride of zinc and sulphate of zinc are readily soluble in cold water, chloride of lead soluble in hot water, but practically insoluble in cold water, and chloride of silver insoluble in either hot or cold water, therefore when the ore is sufficiently chlorinated, as above, and not until this chlorinating is accomplished, I leach it with cold water, either in the tank in which it is chlorinated or elsewhere, and thereby remove from it the chloride of zinc and any sulphate of zinc that the ore contains, and such other chlorides as may be soluble in cold water, leaving in the ore the chlorides above described, which are not so soluble.

The residue or tailings are left in good condition for reduction by the ordinary mode of smelting for any other metals—for example, lead and precious metals therein contained—which smelting operation with the original ore would have been impracticable, owing to the high percentage of zinc.

I am aware that various processes of chlorination have been practiced in the treatment of ores carrying zinc, and that the operations of crushing, roasting, moistening, and leaching have entered into such processes; but such processes as heretofore practiced have been adapted to the recovery of the precious metals from ores containing a small proportion of zinc.

Many ores of precious metals contain zinc in such large quantities and in such combinations that while it is unprofitable to treat them for zinc by ordinary zinc methods, because of these combinations, the very presence of this zinc in such large quantities makes the cost of smelting for the precious metals contained in the ore entirely prohibitory. My process has for its purpose the extraction of this zinc, leaving behind in the ore all of the precious metals, together with the lead and the iron, the two latter being especially valuable as fluxes in subsequent smelting operations. After the zinc has been removed, it is evident that the cost of smelting will be much less than if the zinc had been allowed to remain in the ore, and as in the residue or tailings from the process all of the lead and iron are retained, and therefore the percentage of each increased, a higher price will be paid for the ore by the smelters, thus rendering valuable large bodies of ore which are now practically worthless. By my process of treating zinciferous ores containing gold and iron the formation of ferrous salts, should it occur, would not be objectionable, as the gold, being precipitated thereby, would be retained in the ore and not leached out with the zinc.

What I claim is—

The herein-described process of separating zinc from ores containing precious metals, consisting in, first, crushing the ore; second, roasting the ore; third, moistening the mass to convert it to the woolly condition; fourth, subjecting the mass to the action of free chlorine in a pure condition and continuing the operation of chlorination only until all of the oxide of zinc is converted into chloride of zinc, and, fifth, leaching the ore with cold water, substantially as specified.

In testimony whereof I sign this specification in the presence of two witnesses.

HENRY B. SLATER.

Witnesses:
 M. B. O'DOGHERTY,
 SAMUEL E. THOMAS.